(12) United States Patent
Yu et al.

(10) Patent No.: US 12,287,435 B2
(45) Date of Patent: Apr. 29, 2025

(54) METHOD AND SYSTEM FOR CALIBRATING LIDAR POINT DATA

(71) Applicant: Vueron Technology Co., Ltd., Seoul (KR)

(72) Inventors: Jae Rim Yu, Gyeonggi-do (KR); Chang Hwan Chun, Seoul (KR)

(73) Assignee: Vueron Technology Co., LTD., Seoul (KR)

(*) Notice: Subject to any disclaimer, the term of this patent is extended or adjusted under 35 U.S.C. 154(b) by 458 days.

(21) Appl. No.: 18/046,923

(22) Filed: Oct. 16, 2022

(65) Prior Publication Data

US 2023/0296742 A1    Sep. 21, 2023

(30) Foreign Application Priority Data

Mar. 15, 2022  (KR) .................. 10-2022-0031830
Apr.  7, 2022  (KR) .................. 10-2022-0043294

(51) Int. Cl.
*G01S 7/497* (2006.01)
*G01S 17/89* (2020.01)

(52) U.S. Cl.
CPC .............. *G01S 7/497* (2013.01); *G01S 17/89* (2013.01)

(58) Field of Classification Search
CPC . G06T 7/80; G06T 7/73; G01S 7/4972; G01S 17/89; G01S 7/497
See application file for complete search history.

(56) References Cited

U.S. PATENT DOCUMENTS

| | | | |
|---|---|---|---|
| 11,199,614 B1* | 12/2021 | Gan ................... | G01S 17/42 |
| 2020/0327696 A1* | 10/2020 | Habib ................. | B64U 10/13 |
| 2021/0192788 A1* | 6/2021 | Diederichs .......... | G01S 17/931 |

FOREIGN PATENT DOCUMENTS

| | | |
|---|---|---|
| JP | 2016-045330 A | 4/2016 |
| KR | 10-1547940 B1 | 8/2015 |
| KR | 10-1853122 B1 | 4/2018 |
| KR | 10-2257610 B1 | 5/2021 |
| KR | 10-2021-0081151 A | 7/2021 |
| KR | 10-2310790 B1 | 10/2021 |
| KR | 10-2332512 B1 | 11/2021 |

OTHER PUBLICATIONS

W. Song, L. Zhang, Y. Tian, S. Fong and S. Sun, "3D Hough Transform Algorithm for Ground Surface Extraction from LiDAR Point Clouds," 2019 International Conference on Internet of Things, Atlanta, GA, USA, 2019, pp. 916-921, doi: 10.1109/iThings/GreenCom/CPSCom/SmartData.2019.00163. (Year: 2019).*

A.S. Abdul Rachman, 3D-LIDAR Multi Object Tracking for Autonomous Driving, Degree of Master(Delft university of Technology) (Nov. 9, 2017).

* cited by examiner

*Primary Examiner* — Jennifer Bahls

(74) *Attorney, Agent, or Firm* — You & IP, LLC

(57) ABSTRACT

A system for calibrating light detection and ranging (Lidar) point data can include a computing device having a processor, and a memory configured to store instructions executed by the processor. The instructions are implemented to receive a plurality of 3D points from a Lidar sensor, and calibrate the Lidar point data of the Lidar sensor according to an operation of rotating the plurality of 3D points at an arbitrary angle and an operation of generating planar ground models by randomly extracting the plurality of 3D points rotated by the arbitrary angle.

11 Claims, 16 Drawing Sheets

METHOD AND SYSTEM FOR CALIBRATING LIDAR POINT DATA

CROSS-REFERENCE TO RELATED APPLICATION

This application claims priority to and the benefit of Korean Patent Application No. 10-2022-0031830, filed on Mar. 15, 2022, and Korean Patent Application No. 10-2022-0043294, filed Apr. 7, 2022, the disclosures of which are incorporated herein by reference in their entirety.

1. FIELD OF THE INVENTION

The present invention relates to a method and system for calibrating light detection and ranging (Lidar) point data, and more particularly, to a method and system for calibrating Lidar point data for calibrating a distortion of the Lidar point data according to an installation position of a Lidar sensor.

2. DISCUSSION OF RELATED ART

A light detection and ranging (Lidar) sensor is a sensor that uses light in the form of a pulsed laser to generate a map of an object and its surrounding environment. The Lidar sensor may be used in various fields such as autonomous driving vehicles and mobile robots.

The Lidar sensor is installed on various objects such as vehicles or robots for sensing.

FIG. 1A is a block diagram of a Lidar sensor at a first position. FIG. 2A is a block diagram of a Lidar sensor at a second position.

Referring to FIGS. 1A and 2A, the positions of the Lidar sensors 1 in FIGS. 1A and 1B are different. The Lidar sensor 1 positioned in FIG. 1A is installed parallel to the ground. On the other hand, the Lidar sensor 1 positioned in FIG. 2A is installed at an angle to the ground.

The Lidar sensor 1 uses a local coordinate system. Referring to FIGS. 1A and 2A, according to the local coordinate system, coordinates of three-dimensional (3D) points of an object 7 detected according to the position of the Lidar sensor 1 vary. The local coordinate system is expressed as $(x_L, y_L, z_L)$. Reference numeral 3 in FIGS. 1A and 2A denotes the local coordinate system.

FIG. 1B shows the coordinates of 3D points of an object generated by the Lidar sensor at the first position according to the local coordinate system. FIG. 2B shows the coordinates of 3D points of an object generated by the Lidar sensor at the second position according to the local coordinate system.

Referring to FIGS. 1B and 2B, the coordinates of the 3D points of the generated object 7 vary according to the position of the Lidar sensor 1 even for the object 7 at the same position. In FIGS. 1B and 2B, CL represents a center of the local coordinate system.

Referring to FIGS. 1A and 2A, according to a global coordinate system, the coordinates of the 3D points of the object 7 should be the same regardless of the position of the Lidar sensor 1. The global coordinate system is expressed as $(x_O, y_O, z_O)$. Reference numeral 5 in FIGS. 1A and 2A denotes a global coordinate system.

FIG. 3 shows the coordinates of 3D points of objects generated by Lidar sensors at a first position, a second position, and a third position according to a global coordinate system. FIG. 3A illustrates XZ coordinates of 3D points in the global coordinate system, FIG. 3B illustrates YZ coordinates of the 3D points in the global coordinate system, and FIG. 3C illustrates XY coordinates of the 3D points in the global coordinate system. In FIG. 3A, FIG. 3B, and FIG. 3C, reference numerals P1, P2, and P3 each denote the coordinates of the 3D points of the Lidar sensor 1 according to a first position, the coordinates of the 3D points of the Lidar sensor 1 according to a second position and the coordinates of the 3D points of the Lidar sensor 1 according to a third position. Although the third position of the Lidar sensor 1 is not illustrated in FIGS. 1 and 2, the third position of the Lidar sensor 1 refers to a position different from the first position of the Lidar sensor 1 illustrated in FIG. 1 and the second position of the Lidar sensor 1 illustrated in FIG. 2. Co in FIGS. 3A to 3C represents the center of the global coordinate system.

Referring to FIGS. 1A, 2A, and 3A, the coordinates of the 3D points in the global coordinate system vary according to the position of the Lidar sensor 1 even for the object 7 at the same position. Due to the difference in the coordinates of the 3D points, the position, size, and shape of the object 7 may be calculated differently according to the position of the Lidar sensor 1 even for the same object 7. This means a distortion of the Lidar point data according to the installation position of the Lidar sensor 1. This distortion needs to be calibrated.

In addition, in a system that uses several devices such as a camera and an ultrasonic sensor at the same time, there is a problem of coordinate mismatch.

RELATED ART DOCUMENT

Patent Document (Patent Document 1) Korean Patent Publication No. 10-1853122 (Apr. 23, 2018)

SUMMARY OF THE INVENTION

The present invention provides a method and system for calibrating Lidar point data for calibrating a distortion of Lidar point data according to an installation position of a Lidar sensor.

According to an aspect of the present invention, a method of calibrating Lidar point data includes receiving, by a processor, a plurality of 3D points from a Lidar sensor, rotating, by the processor, the plurality of 3D points at a first arbitrary angle, randomly extracting, by the processor, a plurality of first 3D points rotated by the first arbitrary angle to generate a first planar ground model, rotating, by the processor, the plurality of 3D points at a second arbitrary angle, randomly extracting, by the processor, a plurality of second 3D points rotated by the second arbitrary angle to generate a second planar ground model, determining, by the processor, a planar ground model having a small inclination among the first planar ground model and the second planar ground model, and calibrating, by the processor, the Lidar point data of the Lidar sensor according to the planar ground model having the small inclination.

The method of calibrating Lidar point data may further include generating, by the processor, a first 2.5D grid map including a plurality of first grid cells using the plurality of first 3D points rotated by the first arbitrary angle, and extracting, by the processor, first ground candidate grid cells from the plurality of first grid cells using a height difference between a 3D point having a minimum height value and a 3D point having a maximum height value included in each of the plurality of first grid cells, in which the first planar ground model may be generated by randomly extracting the plurality of first 3D points included in any one of the first ground candidate grid cells.

The method of calibrating Lidar point data may further include generating, by the processor, a second 2.5D grid map including a plurality of second grid cells using the plurality of second 3D points rotated by the second arbitrary angle, and extracting, by the processor, second ground candidate grid cells from the plurality of second grid cells using a height difference between a 3D point having a minimum height value and a 3D point having a maximum height value included in each of the plurality of second grid cells, in which the second planar ground model may be generated by randomly extracting the plurality of second 3D points included in any one of the second ground candidate grid cells.

The method of calibrating Lidar point data may further include rotating, by the processor, a plurality of 3D points at a third arbitrary angle, and generating, by the processor, a third planar ground model by randomly extracting a plurality of third 3D points rotated by the third arbitrary angle.

A planar ground model having a small inclination may be a planar ground model having the smallest inclination among the first planar ground model, the second planar ground model, and the third planar ground model.

The calibrating of, by the processor, the Lidar point data of the Lidar sensor according to the planar ground model having the small inclination may include storing, by the processor, a rotation angle corresponding to the planar ground model having the small inclination, receiving, by the processor, a plurality of different 3D points from the Lidar sensor at different times, rotating, by the processor, the plurality of different 3D points at the stored rotation angle, generating, by the processor, other 2.5D grid maps including a plurality of different grid cells using a plurality of different 3D points rotated by the stored rotation angle, extracting, by the processor, other ground candidate grid cells from the plurality of different grid cells, randomly extracting, by the processor, the plurality of different 3D points included in any one of the other extracted ground candidate grid cells to generate other planar ground models, and calculating, by the processor, an offset of the other planar ground models, and calibrating positions of the plurality of different 3D points according to the calculated offset.

According to another aspect of the present invention, a system for calibrating Lidar point data includes a computing device.

The computing device includes a processor and a memory configured to store instructions executed by the processor.

The instructions are implemented to receive a plurality of 3D points from a Lidar sensor, repeatedly perform an operation of rotating the plurality of 3D points at an arbitrary angle and an operation of generating planar ground models by randomly extracting the plurality of 3D points rotated by the arbitrary angle for a predetermined arbitrary number of times to generate a plurality of planar ground models having different inclinations, determine a planar ground model having the smallest inclination among the plurality of generated planar ground models having different inclinations, and calibrate the Lidar point data of the Lidar sensor according to the planar ground model having the smallest inclination.

The instructions may be implemented to further perform an operation of generating a 2.5D grid map including a plurality of grid cells using the plurality of 3D points rotated by the arbitrary angle and an operation of extracting ground candidate grid cells from the plurality of grid cells using a height difference between a 3D point having a minimum height value and a 3D point having a maximum height value included in each of the plurality of grid cells between the operation of rotating and the operation of generating planar ground models.

The plurality of generated planar ground models having different inclinations may be generated by randomly extracting 3D points included in the extracted ground candidate grid cells.

BRIEF DESCRIPTION OF THE DRAWINGS

In order to more fully understand the drawings mentioned in the detailed description of the present disclosure, a detailed description of each drawing is provided.

DETAILED DESCRIPTION OF EXEMPLARY EMBODIMENTS

Figure 1A:
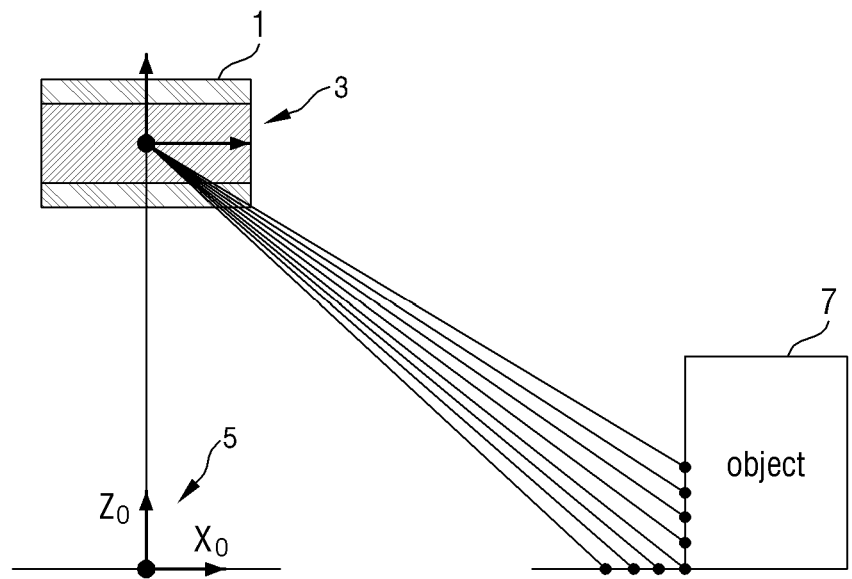
FIG. 1A is a block diagram of a light detection and ranging (Lidar) sensor at a first position.
Figure 1B:
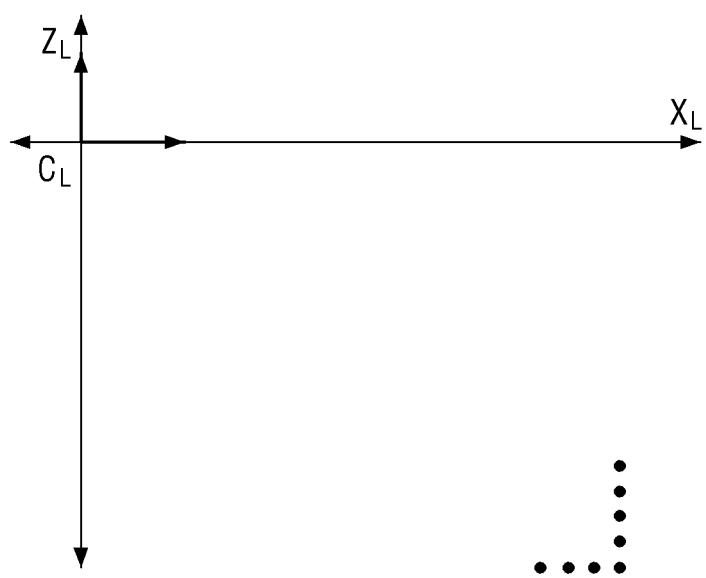
FIG. 1B shows the coordinates of three-dimensional (3D) points of an object generated by the Lidar sensor at the first position according to a local coordinate system.
Figure 2A:
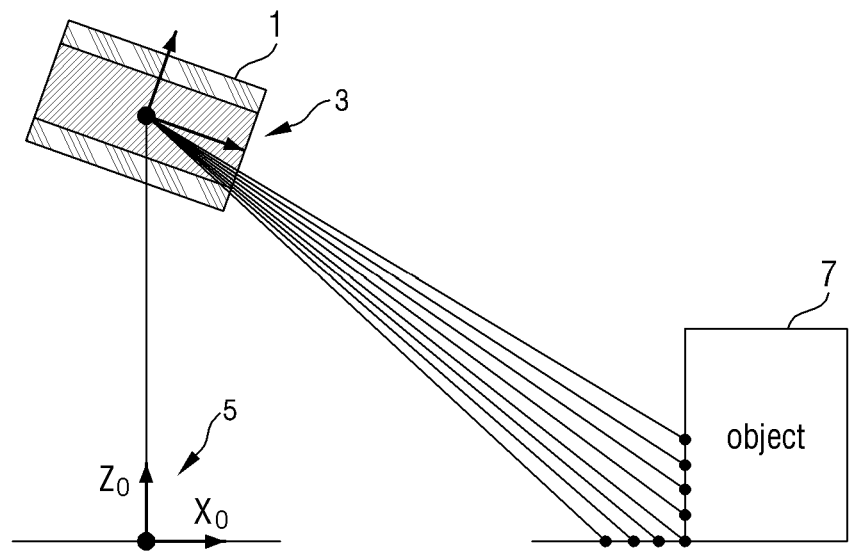
FIG. 2A is a block diagram of a Lidar sensor at a second position.
Figure 2B:
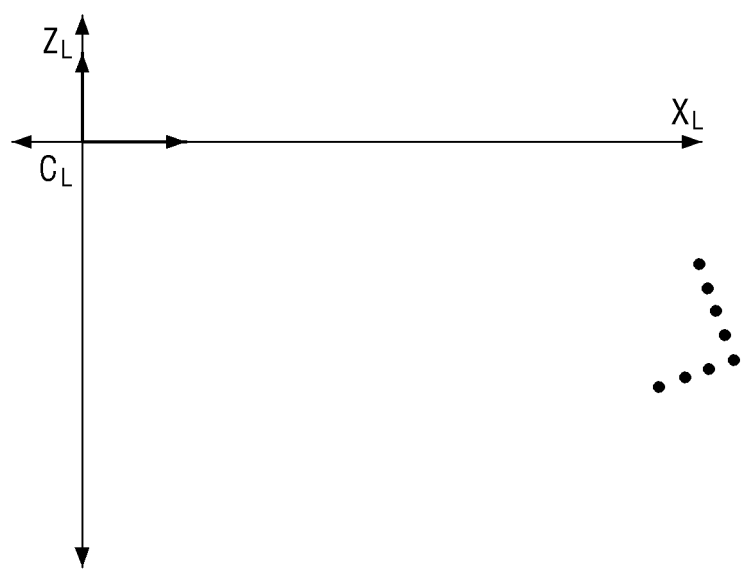
FIG. 2B shows the coordinates of 3D points of an object generated by the Lidar sensor at the second position according to the local coordinate system.
Figure 3:
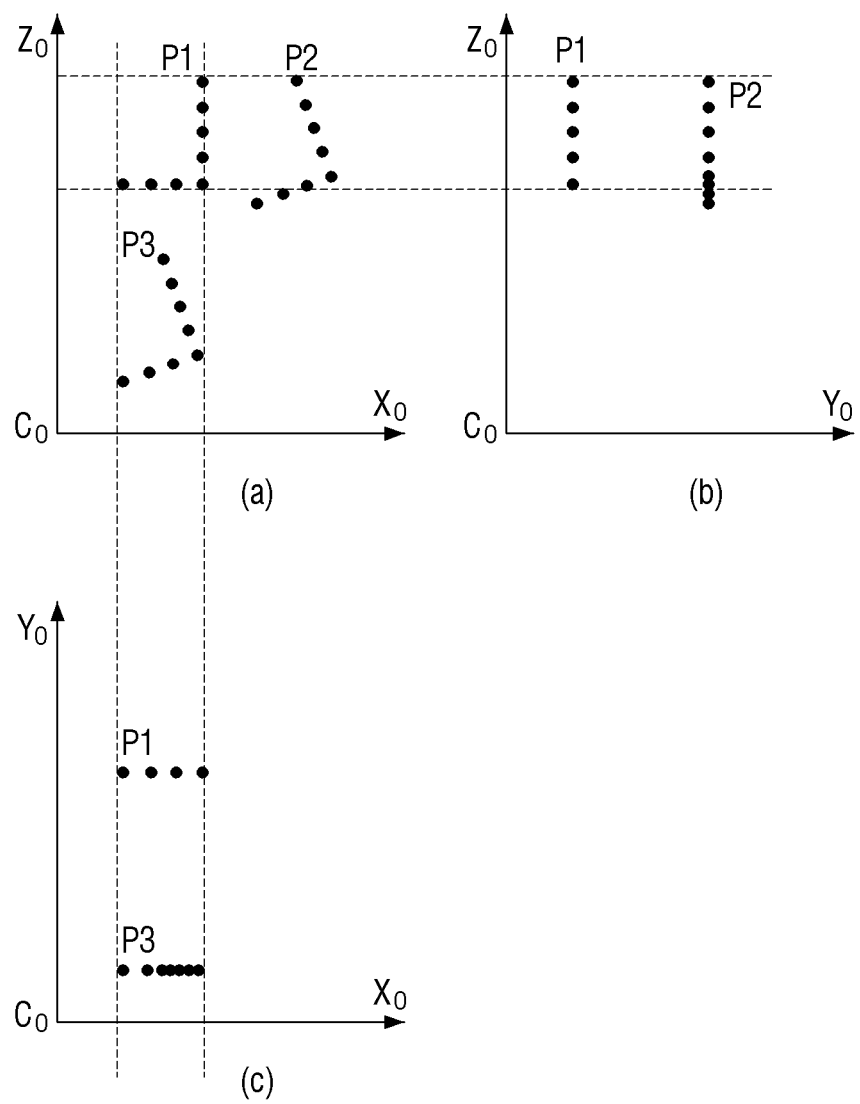
FIG. 3 show the coordinates of 3D points of objects generated by Lidar sensors at a first position, a second position, and a third position according to a global coordinate system.
Figure 4:
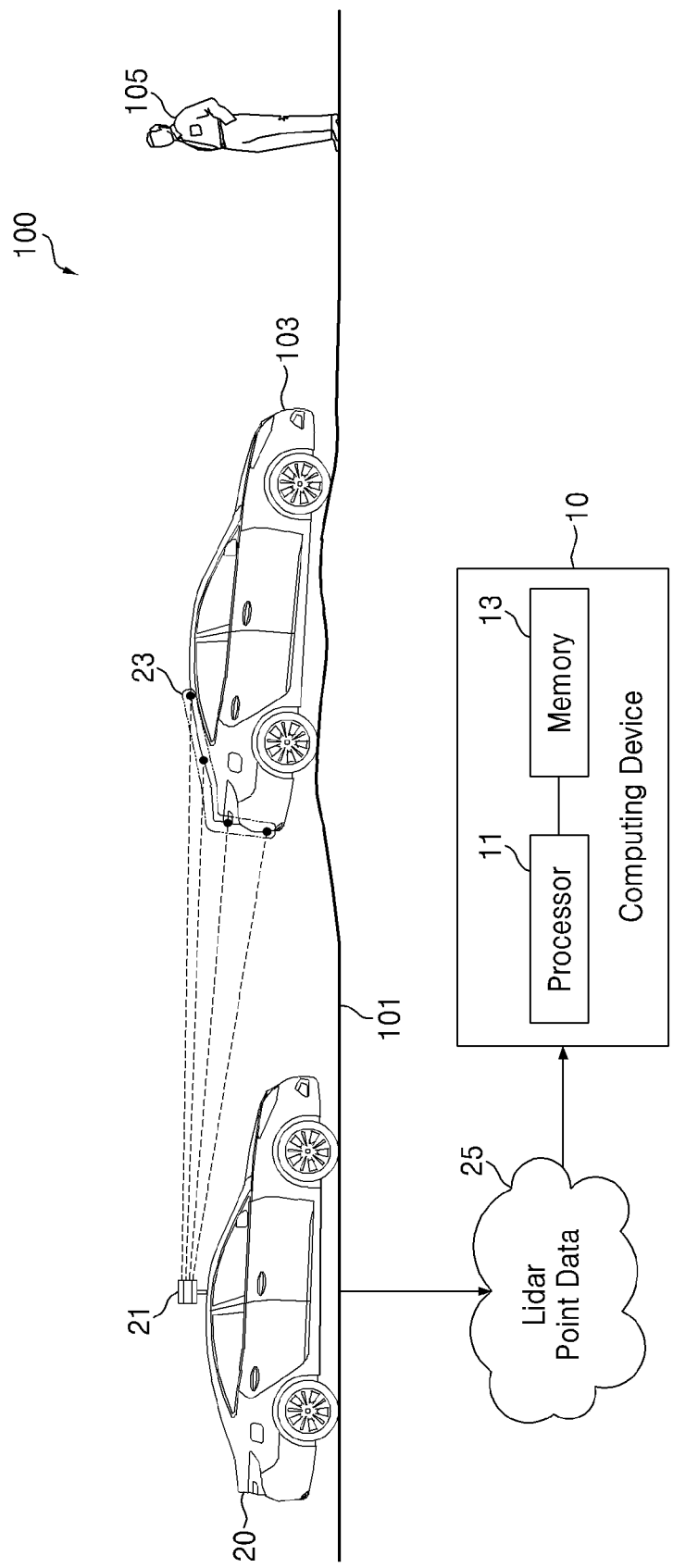
FIG. 4 is a block diagram of a system for calibrating Lidar point data according to an embodiment of the present invention.

FIG. 4 is a block diagram of a system for calibrating light detection and ranging (Lidar) point data according to an embodiment of the present invention.

Referring to FIG. 4, a system 100 for calibrating Lidar point data 25 refers to a system for calibrating the coordinate distortion of 3D points according to a position of the Lidar sensor 21.

The ground is an area, such as a road 101, on which people or vehicles may move. The non-ground refers to an area excluding the ground. For example, the non-ground is an object such as a street light, a road sign, a vehicle 103, or a pedestrian 105.

In the Lidar point data 25 for autonomously driving a vehicle 20, it is necessary to distinguish a ground such as a road 101 and a non-ground such as other vehicles 103 or the pedestrian 105. In addition, in the Lidar point data 25, a distinction between a ground such as a road 101 and the non-ground such as other vehicles 103 or the pedestrian 105 may be used in the security field.

The system 100 for calibrating Lidar point data 25 includes a computing device 10.

The vehicle 20 includes a Lidar sensor 21. The Lidar sensor 21 generates the Lidar point data 25 including a plurality of 3D points. The Lidar sensor 21 installed in the vehicle 20 generates the Lidar point data 25 for various surrounding environments of the vehicle 20 while the vehicle 20 moves. The Lidar point data 25 includes a plurality of 3D points 23. That is, the Lidar point data 25 includes the plurality of 3D points 23. The plurality of 3D points 23 is a 3D point cloud.

The computing device 10 may be implemented as a hardware module combined with other pieces of hardware inside the vehicle 20, or as an independent hardware device. For example, the computing device 10 may be implemented in an electronic control unit (ECU) of the vehicle 20. In addition, the computing device 10 may be implemented as an external electronic device such as a computer, a notebook computer, a personal computer (PC), a server, or a tablet PC.

The computing device 10 includes a processor 11 and a memory 13. The processor 11 executes instructions for calibrating the Lidar point data 25. The memory 13 stores the instructions. The calibration of the Lidar point data 25 refers to distortion calibration of the coordinates of the 3D points 23.

The processor 11 receives the Lidar point data 25 including the plurality of 3D points 23 from the Lidar sensor 21.

The processor 11 generates a 2.5D grid map using the Lidar point data 25. The 2.5D grid map refers to a map in which height information is partially added to the 2D grid map.

Figure 5:
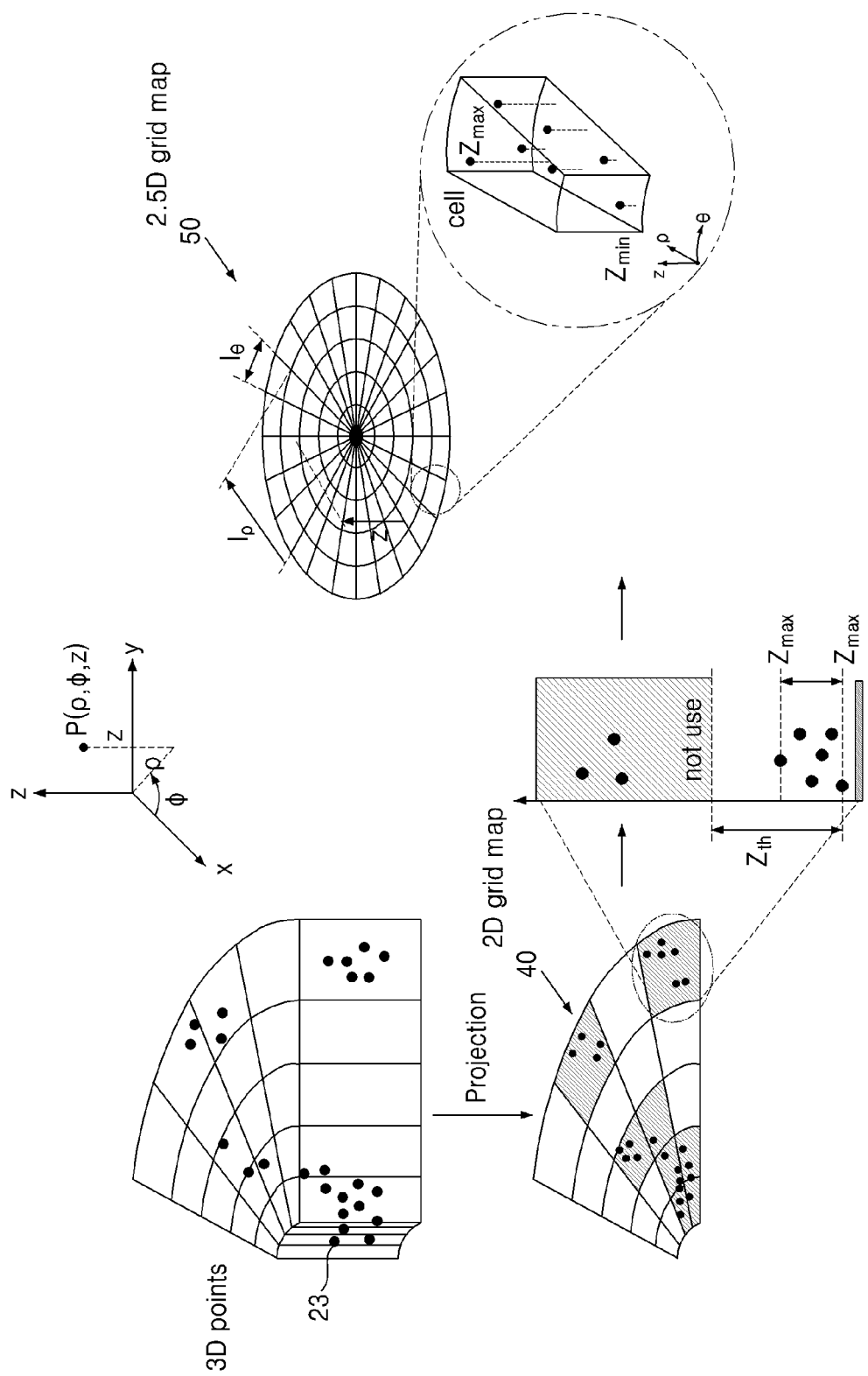
FIG. 5 is a conceptual diagram of a 2.5D grid map generated by a processor illustrated in FIG. 4.
Figure 6:
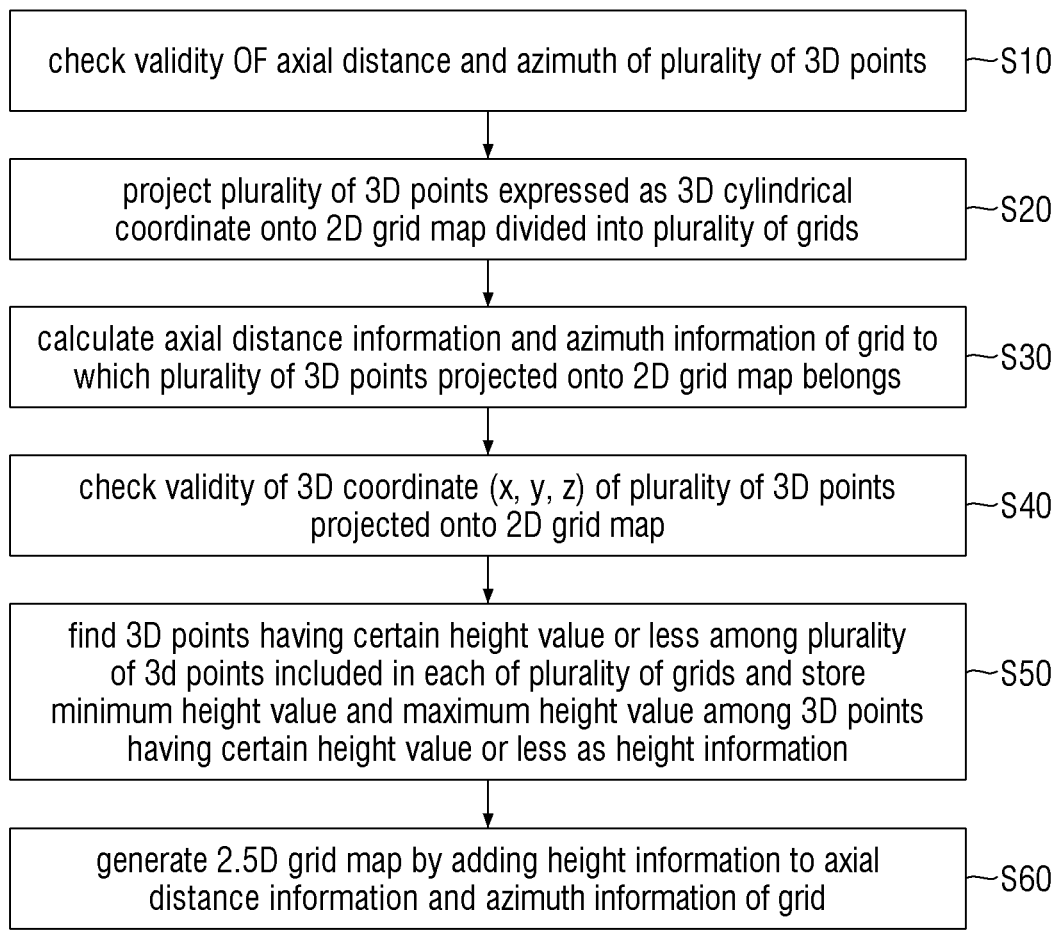
FIG. 6 is a flowchart illustrating a method of generating a 2.5D grid map illustrated in FIG. 4.

FIG. 5 is a conceptual diagram of a 2.5D grid map generated by a processor illustrated in FIG. 4. FIG. 6 is a flowchart illustrating a method of generating a 2.5D grid map illustrated in FIG. 4.

Referring to FIGS. 4 to 6, the processor 11 checks the validity of an axial distance ρ and an azimuth θ of the plurality of 3D points 23 expressed as 3D cylindrical coordinates (S10). The processor 11 excludes 3D points having a negative axial distance ρ and azimuth θ from among the plurality of 3D points 23. The axial distance p and azimuth θ may have negative values due to communication errors and noise.

The processor 11 projects the plurality of 3D points 23 onto a 2D grid map 40 divided into a plurality of grids (S20). Each of the plurality of 3D points 23 is expressed as 3D cylindrical coordinates (ρ, θ, z). The axial distance p refers to a Euclidean distance from a z-axis to a point. The azimuth θ refers to an angle between a reference direction (represented by an x-axis in FIG. 4) and a line from an origin to a point on a plane, on the selected plane. The height z refers to a distance from the selected plane to the point. One grid may include a plurality of 3D points.

According to an embodiment, each of the plurality of 3D points 23 may be expressed as Cartesian coordinates (x, y, z). When each of the plurality of 3D points 23 is expressed as the Cartesian coordinates (x, y, z), the processor 11 transforms the Cartesian coordinates into 3D cylindrical coordinates.

The processor 11 calculates axial distance information $I_\rho$ and azimuth information $I_\theta$ of each of the plurality of grids to which the plurality of 3D points 23 projected onto the 2D grid map 40 belong (S30).

The processor 11 checks the validity of the 3D coordinates (x, y, z) of the plurality of 3D points projected onto the 2D grid map 40 (S40). The processor 11 may transform the plurality of 3D points 23 from the 3D cylindrical coordinates into the Cartesian coordinates.

The processor 11 excludes points having an x value, a y value, or a z value greater than an arbitrary value among the 3D coordinates (x, y, z) of the plurality of 3D points projected onto the 2D grid map 40 as noise.

The processor 11 finds 3D points less than or equal to a predetermined height value $Z_{th}$ among the plurality of 3D points 23 included in each of the plurality of grids, and stores, as height information $z_{min}$ and $z_{max}$, a minimum height value $z_{min}$ and a maximum height value $z_{max}$ among the 3D points less than or equal to the predetermined height value $Z_{th}$ (S50). This is because, among the plurality of 3D points 23, 3D points greater than or equal to the predetermined height value $Z_{th}$ may not be considered as the ground.

According to an embodiment, the processor 11 may determine, as the minimum height value $z_{min}$, a 3D point having the lowest height among the plurality of 3D points 23 included in each of the plurality of grids and determine, as the maximum height value $z_{max}$, a 3D point having the highest height among the 3D points less than or equal to a certain height value from the minimum height value $z_{min}$ to store the minimum height value $z_{min}$ and the maximum height value $z_{max}$ as the height information $z_{min}$ and $z_{max}$.

The processor 11 generates a 2.5D grid map 50 by adding the height information $z_{min}$ and $z_{max}$ to the axial distance information $I_\rho$ and the azimuth information $I_\theta$ (S60). That is, the position of the grid may be expressed by the axial distance information $I_\rho$ and the azimuth information $I_\theta$.

That is, the height information in the 2.5D grid map 50 includes only the minimum height value $z_{min}$ and the maximum height value $z_{max}$. The 2.5D grid map 50 is divided into a plurality of grid cells. The plurality of grid cells correspond to the plurality of grids in the 2D grid map 40. However, the coordinates of the plurality of grids in the 2D grid map 40 are expressed in two dimensions, and does not include the height information. However, the plurality of grid cells in the 2.5D grid map 50 includes the minimum height value $z_{min}$ and the maximum height value $z_{max}$. In this specification, a grid refers to a grid in the 2D grid map 40, and a grid cell refers to a grid cell in the 2.5D grid map 50. One grid cell may include a plurality of 3D points. One grid cell is expressed by the axial distance information $I_p$, the azimuth information $I_\theta$, and the height information $z_{min}$ and $z_{max}$. In the 2.5D grid map 50, the positions of each of the plurality of 3D points 23 is not expressed, but the positions (axial distance information $I_p$, azimuth information $I_\theta$, and height information $z_{min}$ and $z_{max}$) of each grid cell to which each of the plurality of 3D points 23 belongs are expressed. In addition, each of the plurality of grid cells includes state information of the grid cell. Also, the state information of the grid cell may be divided into an invalid candidate grid cell, a ground candidate grid cell, and an object candidate grid cell. The invalid candidate grid cell refers to a grid cell in which the number of 3D points in a cell is less than or equal to an arbitrary number and there is a possibility of an invalid grid cell. The ground candidate grid cell refers to a grid cell having a potential of the ground. The object candidate grid cell means a non-ground, that is, a grid cell in which an object is likely to be present.

The invalid candidate grid cell, the ground candidate grid cell, and the object candidate grid cell may be changed to an invalid grid cell, a ground grid cell, or an object grid cell according to an additional determination of the processor 11.

The invalid grid cell refers to grid cells other than the ground grid cell and the object grid cell. The ground grid cell refers to a grid cell having a ground. The object grid cell refers to a non-ground, that is, a grid cell in which an object is present.

Figure 7:
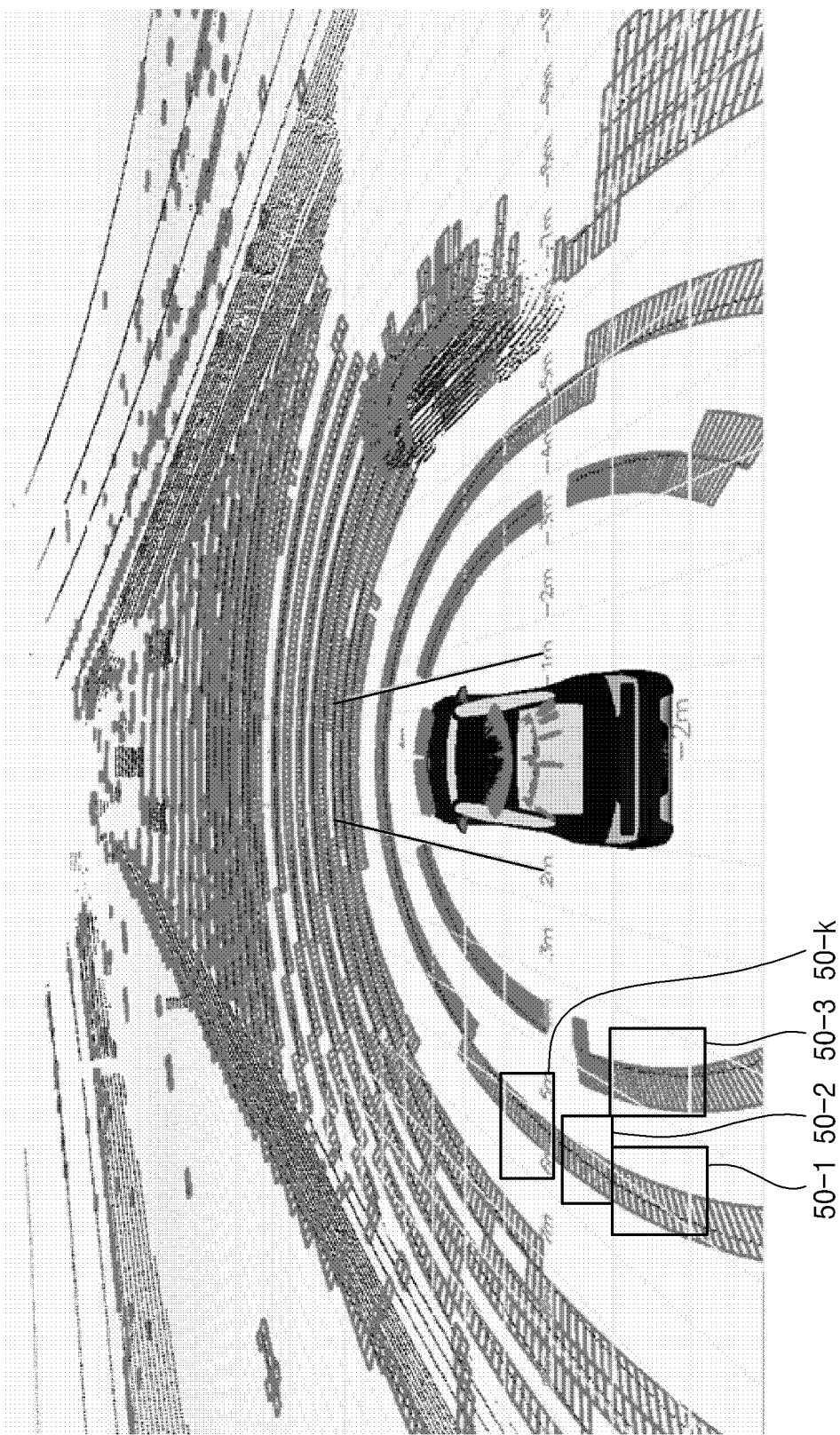
FIG. 7 is a diagram illustrating an image of the 2.5D grid map.

FIG. 7 illustrates an image of the 2.5D grid map.

Referring to FIG. 7, a plurality of grid cells 50-1 to 50-$k$ ($k$ is a natural number) are illustrated in the 2.5D grid map.

Figure 8:
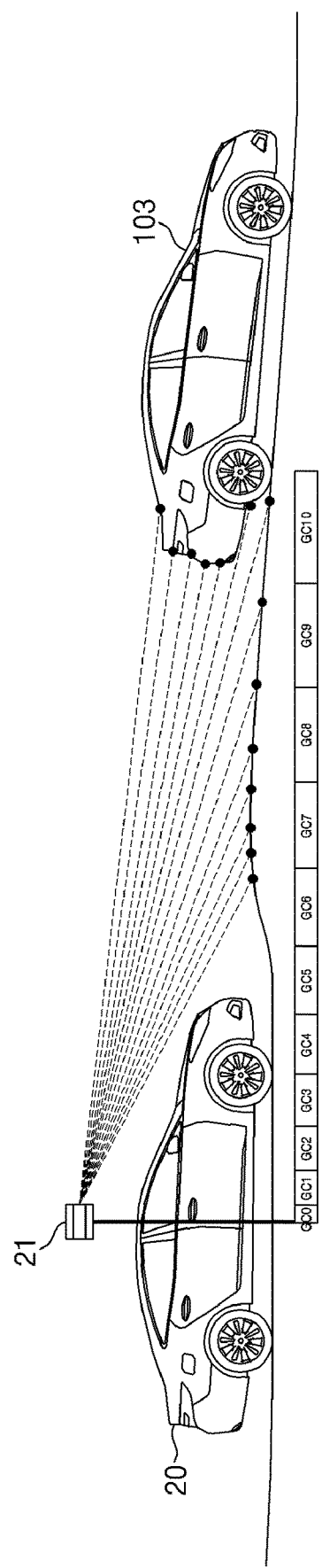
FIG. 8 is a conceptual diagram for describing the operations of extracting ground candidate grid cells from the 2.5D grid map illustrated in FIG. 7.
Figure 9:
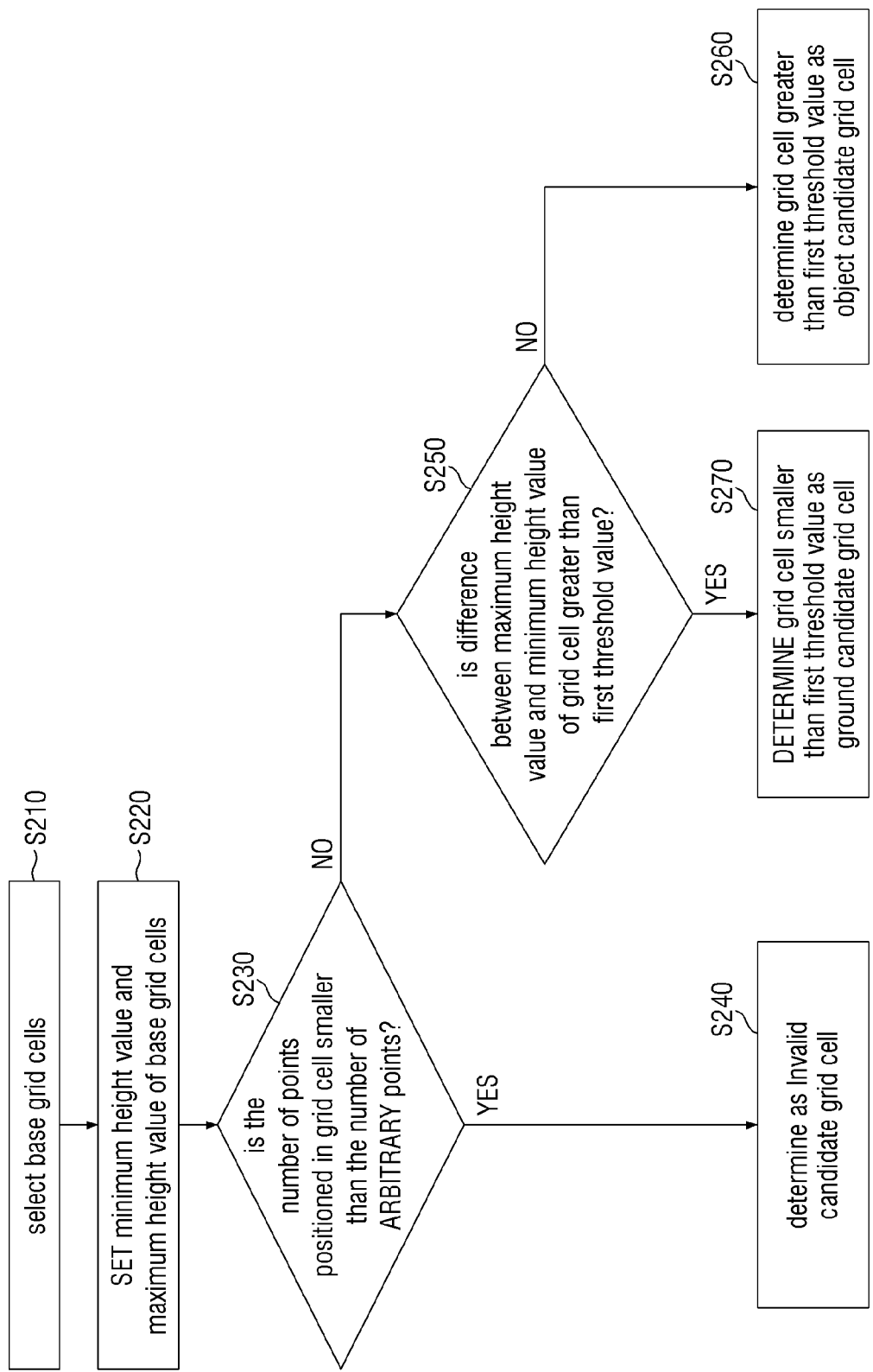
FIG. 9 is a flowchart for describing the operations of extracting the ground candidate grid cells from the 2.5D grid map illustrated in FIG. 7.

FIG. 8 is a conceptual diagram for describing the operations of extracting ground candidate grid cells from the 2.5D grid map illustrated in FIG. 7. FIG. 9 is a flowchart for describing the operations of extracting the ground candidate grid cells from the 2.5D grid map illustrated in FIG. 7.

Referring to FIGS. 4 to 8, a size of the grid cell increases from a grid cell GC0 to a grid cell GC10. That is, in the 2.5D grid map 50, the size of the grid cell increases in an arithmetic sequence as the distance from the origin increases in a direction of the axial distance p. FIG. 7 illustrates that grid cells GC0 to GC10 represent grid cells aligned in the direction of the axial distance p from the origin of the 2.5D grid map 50. The origin refers to the coordinates of the center of the 2.5D grid map 50.

The processor 11 extracts ground candidate grid cells from the 2.5D grid map 50. The ground candidate grid cell refers to a grid cell in which there is a possibility of having a ground other than an invalid grid cell and an object grid cell in the plurality of grid cells GC0 to GC10. The ground candidate grid cell may be determined to be a ground grid cell, or may be changed to the object grid cell or the invalid grid cell, according to the additional determination of the processor 11. Hereinafter, the operations of extracting, by the processor 11, the ground candidate grid cell from the 2.5D grid map 50 will be described.

The processor 11 arbitrarily selects a plurality of grid cells from the 2.5D grid map 50 as base grid cells (S210). Grid cells corresponding to a width of the vehicle 20 may be selected as the base grid cells. For example, the grid cells GC0 to GC4 may be selected as the base grid cells.

The processor 11 assigns 0 to each of the minimum height value $z_{min}$ and the maximum height value $z_{max}$ of each of the plurality of grid cells GC0 to GC4 included in the base grid cells, and sets the plurality of grid cells to the ground candidate grid cells (S220). That is, the processor 11 assigns 0 to each of the minimum height value $z_{min}$ and the maximum height value $z_{max}$ of each of the plurality of grid cells GC0, GC1, GC2, GC3, and GC4 included in the base grid cell candidate. The processor 11 sets the state information of each of the plurality of grid cells to the ground candidate grid cell. The ground candidate grid cell refers to the grid cell having the potential of the ground. Also, the ground candidate grid cell may be determined to be a grid cell having the ground according to the additional determination of the processor 11.

In the grid cells GC0 to GC4 close to the Lidar sensor 21, many points cannot be generated by the Lidar sensor 21. This is a characteristic according to the type and mounting position of the Lidar sensor 21. Accordingly, the processor 11 selects the base grid cells in consideration of this characteristic and sets the base grid cells to the ground candidate grid cells GC0 to GC4.

The processor 11 determines whether the number of points positioned in each grid cell GC5 to GC10 is smaller than the number of arbitrary points for the remaining grid cells GC5 to GC10 except for the plurality of grid cells GC0 to GC4 selected as base grid cells in the 2.5D grid map 50. For example, it is determined whether the number of points included in the grid cell GC5 is smaller than the number of arbitrary points. The number of arbitrary points may be 1 or 2. The processor 11 determines the grid cell to which the number of points smaller than the number of arbitrary points belongs among the remaining grid cells GC5 to GC10 (S240) to be an invalid candidate grid cell. The invalid candidate grid cell is determined to be an invalid grid cell in which the number of 3D points in the cell is less than or equal to an arbitrary number according to the additional determination of the processor 11, but refers to a grid cell that may be changed to the ground grid cell or the object grid cell. For example, the grid cell GC5, GC6, GC7, GC8, GC9, or GC10 may be determined to be invalid candidate grid cells.

Figure 10:
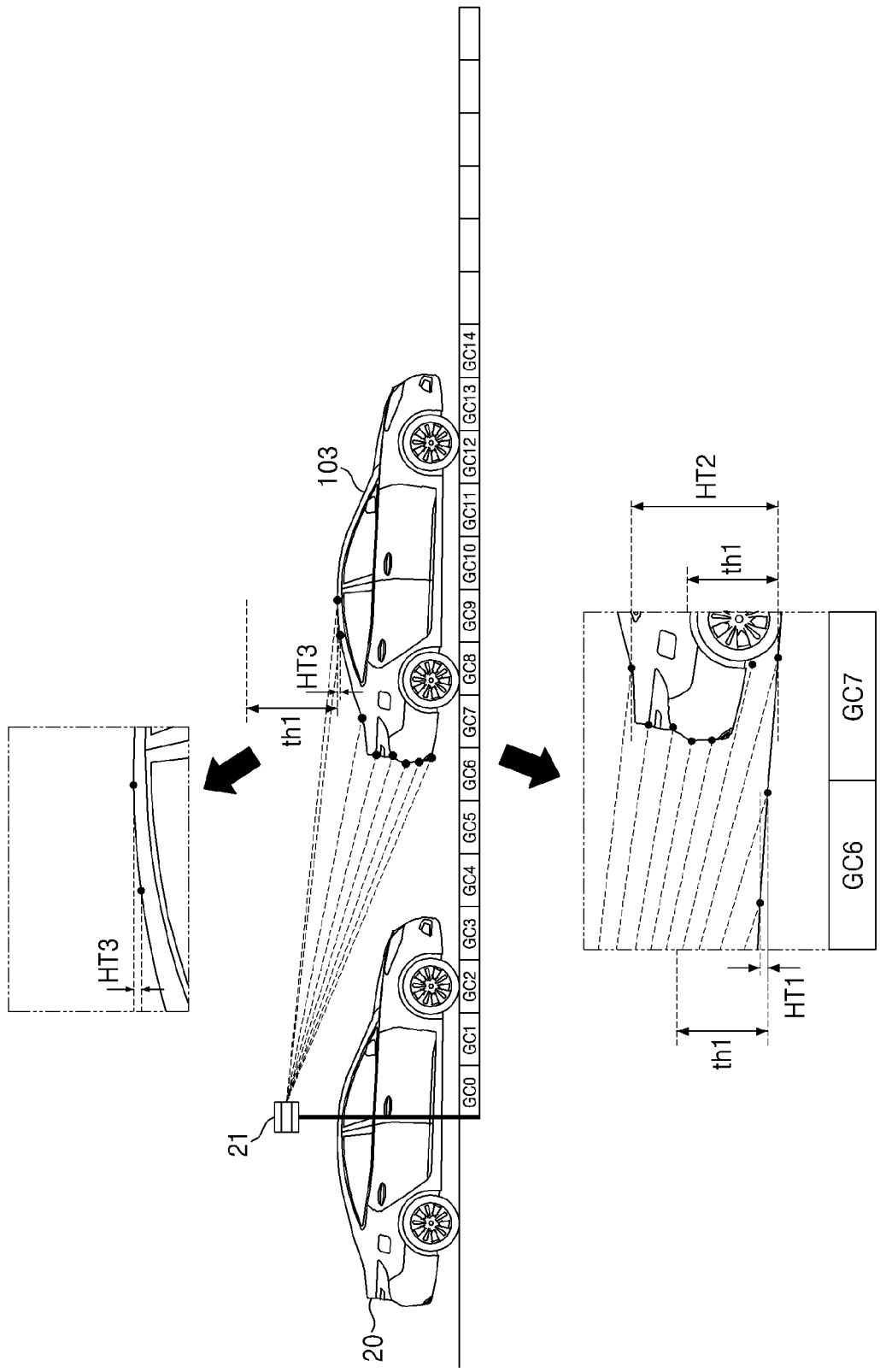
FIG. 10 is a conceptual diagram for describing additional operations of extracting the ground candidate grid cells from the 2.5D grid map illustrated in FIG. 7.

FIG. 10 is a conceptual diagram for describing additional operations of extracting the ground candidate grid cells from the 2.5D grid map illustrated in FIG. 7.

Referring to FIGS. 4 to 10, it is illustrated that the size of the grid cell increases from the grid cell GC0 to the grid cell GC14, but in FIG. 10, the size of the grid cell is the same for convenience of drawing. In FIG. 10, the grid cell GC0 to the grid cell GC14 represent grid cells aligned in the direction of the axial distance p from the origin of the 2.5D grid map 50.

The processor 11 compares the difference (e.g., HT1, HT2, or HT3) between the maximum height value $z_{max}$ and the minimum height value $z_{min}$ with a first threshold value th1 for each of the grid cells (e.g., GC5, GC6, GC7, GC8, GC9, or GC10) to which the number of points greater than the number of the arbitrary points belongs among the remaining grid cells (e.g., GC5 to GC10) (S250). In FIG. 8, the remaining grid cells are expressed as "GC5 to GC10," but in FIG. 10, the remaining grid cells may be expressed as "GC5 to GC14."

As the distance from the origin of the 2.5D grid map 50 increases in the direction of the axial distance p, the first threshold value th1 increases. For example, the first threshold value th1 of the grid cell GC5 is different from the first threshold value th1 of the grid cell GC14. The first threshold value th1 of the grid cell GC14 is greater than the first threshold value th1 of the grid cell GC5. According to an embodiment, the first threshold value th1 may be arbitrarily set.

The processor 11 determines the grid cell in which the difference (e.g., HT1, HT2, or HT3) is smaller than the first threshold value th1 (S260) to be a ground candidate grid cell. For example, in the case of the grid cell GC6, a plurality of 3D points are included in one grid cell GC6. The grid cell GC6 has a maximum height value $z_{max}$ and a minimum height value $z_{min}$. The processor 11 determines that the difference HT1 between the maximum height value $z_{max}$ and the minimum height value $z_{min}$ of the grid cell GC6 is smaller than the first threshold value th1. Accordingly, the processor 11 determines the grid cell GC6 to be the ground candidate grid cell.

The processor 11 determines the grid cell in which the difference (e.g., HT1, HT2, or HT3) is larger than the first threshold value th1 (S270) to be an object candidate grid cell. For example, the processor 11 determines that the difference HT2 between the maximum height value $z_{max}$ and the minimum height value $z_{min}$ of the grid cell GC7 is larger than the first threshold value th1. Accordingly, the processor 11 determines the grid cell GC7 to be the object candidate grid cell.

The invalid grid cell, the ground candidate grid cell, and the object grid cell represent the state information of the grid cell.

However, the processor 11 determines a grid cell in which the difference is greater than the first threshold value th1 to be an object grid cell. For example, the processor 11 determines that the difference HT2 between the maximum height value $z_{max}$ and the minimum height value $z_{min}$ of the grid cell GC7 is larger than the first threshold value th1. Accordingly, the processor 11 determines the grid cell GC7 to be the object candidate grid cell.

The processor 11 determines that the difference HT3 between the maximum height value $z_{max}$ and the minimum height value $z_{min}$ of the grid cell GC9 is smaller than the first threshold value th1. Accordingly, the processor 11 determines the grid cell GC9 to be a ground candidate grid cell.

According to an embodiment, the processor 11 may use the height difference between the 3D point having the minimum height value $z_{max}$ and the 3D point having the maximum height value $z_{min}$ included in each of the plurality of grid cells to extract the ground candidate grid cells from the plurality of grid cells. Specifically, when the processor 11 determines that the height difference between the 3D point having the minimum height value $z_{max}$ and the 3D point having the maximum height value $z_{min}$ included in each of the plurality of grid cells is smaller than a certain threshold value, the processor 11 determines grid cells in which the height difference between the 3D point having the minimum height value $z_{max}$ and the 3D point having the maximum height value $z_{min}$ is less than an arbitrary threshold to be ground candidate grid cells.

Figure 11:
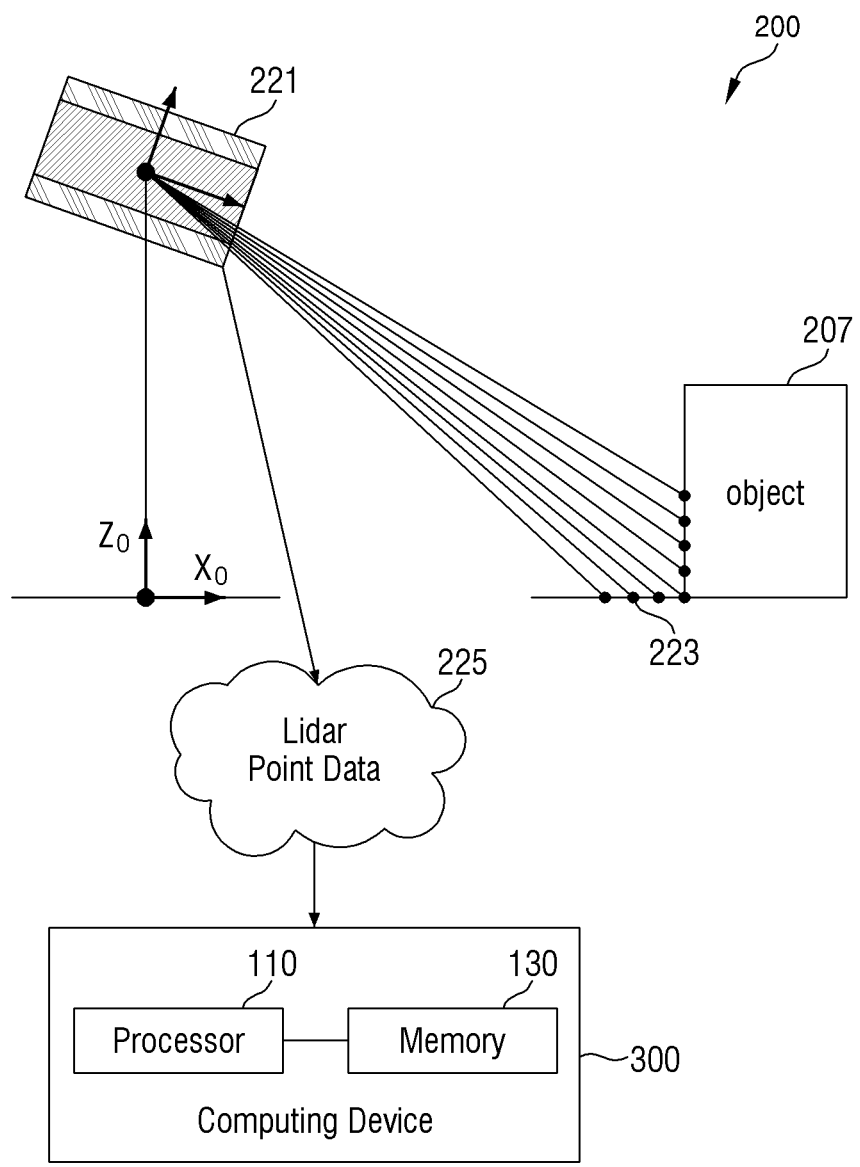
FIG. 11 is a block diagram of a system for calibrating Lidar point data according to another embodiment of the present invention.

FIG. 11 is a block diagram of a system for calibrating Lidar point data according to another embodiment of the present invention.

Referring to FIG. 11, a system 200 for calibrating Lidar point data 225 refers to a system for calibrating a coordinate distortion of 3D points according to a position of the Lidar sensor 221. There is a difference in that the system 100 for calibrating Lidar point data 25 of FIG. 4 is installed in the moving vehicle 20, but the system 200 for calibrating Lidar point data 225 of FIG. 11 is installed at a fixed position. However, the system 200 for calibrating Lidar point data 225 of FIG. 11 and the system 100 for calibrating Lidar point data 25 of FIG. 4 are similar in that they relate to a method of calibrating Lidar point data. The method of generating a 2.5D grid map is intactly applied in the system 200 for calibrating Lidar point data 225 of FIG. 11.

The system 200 for calibrating Lidar point data 225 includes a Lidar sensor 221 and a computing device 300.

The Lidar sensor 221 generates the Lidar point data 225 including a plurality of 3D points. The Lidar sensor 221 installed at the fixed position generates the Lidar point data 225 for various surrounding environments at the fixed position.

The Lidar point data 225 includes a plurality of 3D points 223. That is, the Lidar point data 225 includes the plurality of 3D points 223. The plurality of 3D points 223 is a 3D point cloud.

The Lidar sensor 221 generates the point data 225 including 3D points 223 for an object 207.

The computing device 300 may be implemented as a hardware module combined with other pieces of hardware, or as an independent hardware device. For example, the computing device 300 may be implemented as an external electronic device such as a computer, a notebook computer, a PC, a server, or a tablet PC.

The computing device 300 includes a processor 110 and a memory 130. The processor 110 executes instructions for calibrating the Lidar point data 225. The memory 130 stores the instructions. The calibration of the Lidar point data 225 refers to the distortion calibration of the coordinates of the 3D points 223.

The processor 110 receives the Lidar point data 225 including the plurality of 3D points 223 from the Lidar sensor 221.

The processor 110 generates a 2.5D grid map using the Lidar point data 225. The 2.5D grid map refers to a map in which height information is partially added to the 2D grid map.

Figure 12:
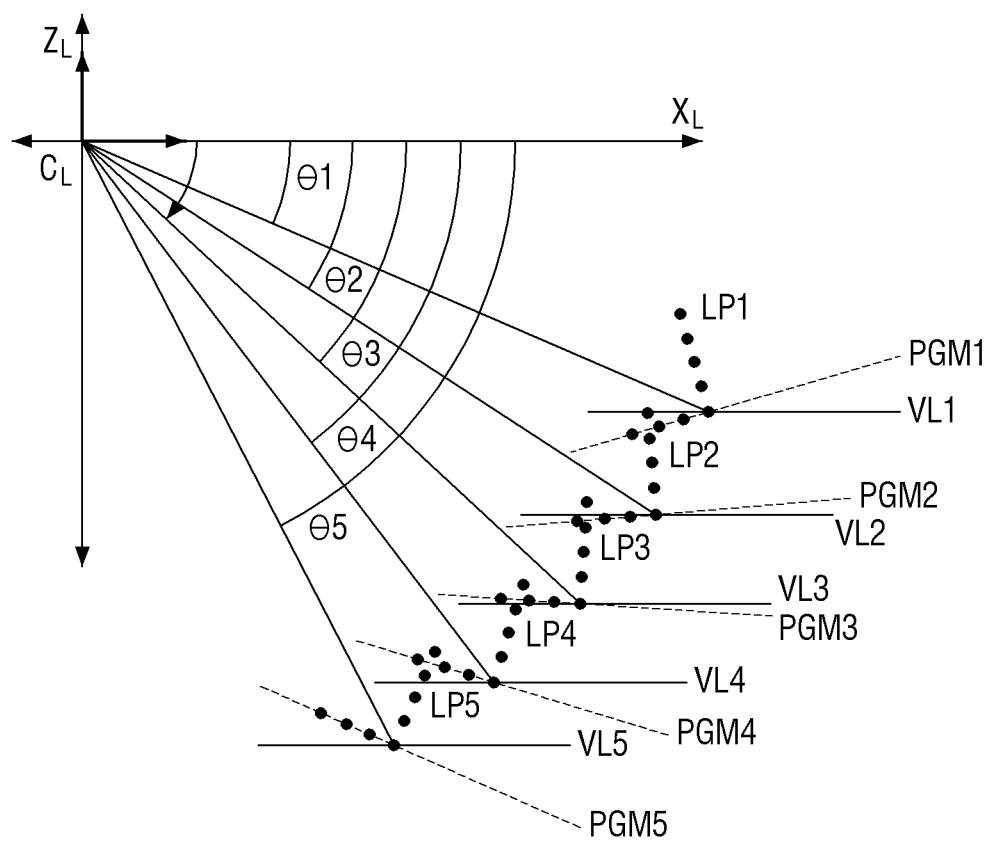
FIG. 12 shows a local coordinate system of 3D points of objects generated according to different positions of a Lidar sensor illustrated in FIG. 11.
Figure 13:
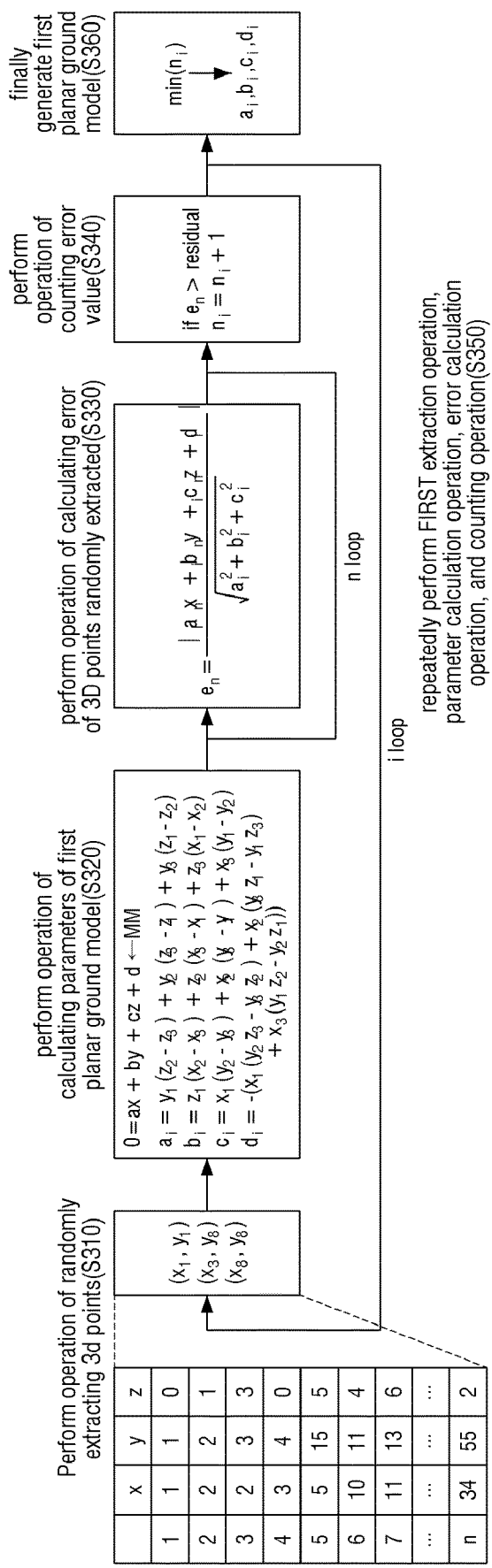
FIG. 13 is a flowchart for describing a method of generating a planar ground model according to an embodiment of the present invention.
Figure 14:
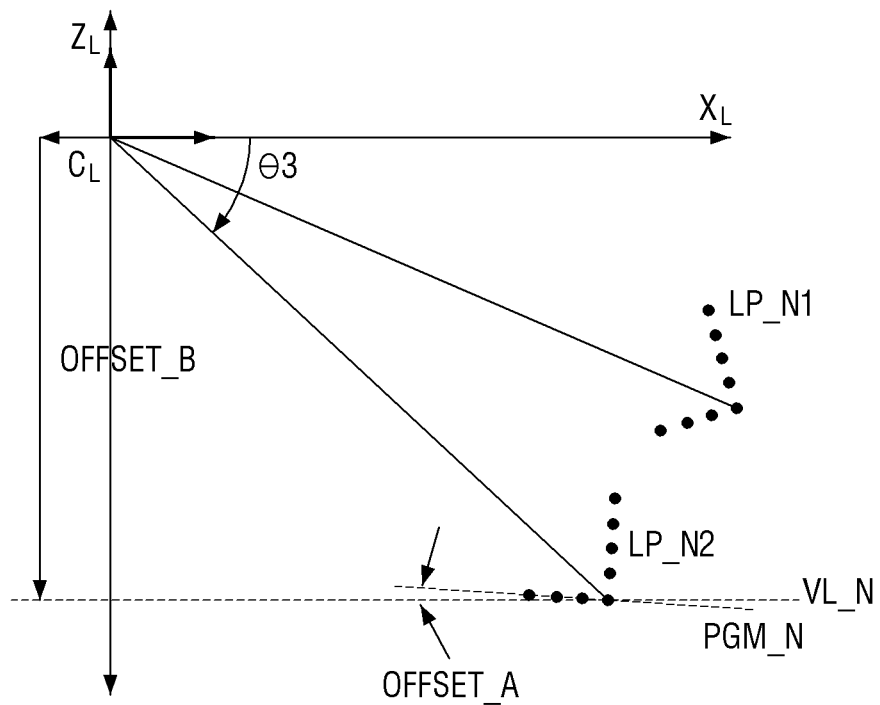
FIG. 14 shows a local coordinate system of 3D points generated according to a specific position of the Lidar sensor illustrated in FIG. 11.
Figure 15:
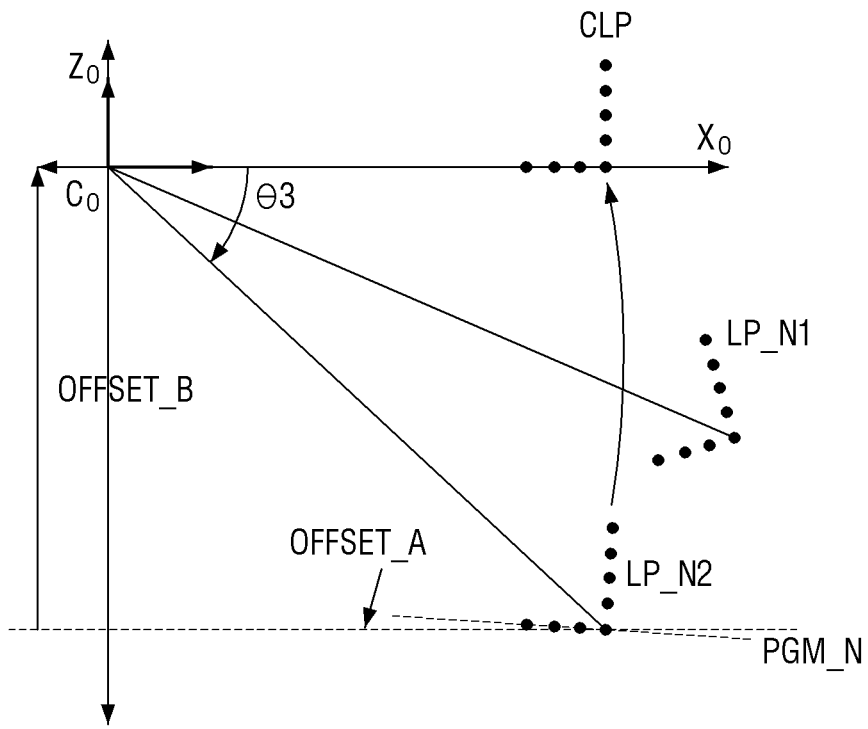
FIG. 15 shows a global coordinate system obtained by transforming the local coordinate system illustrated in FIG. 14.
Figure 16:
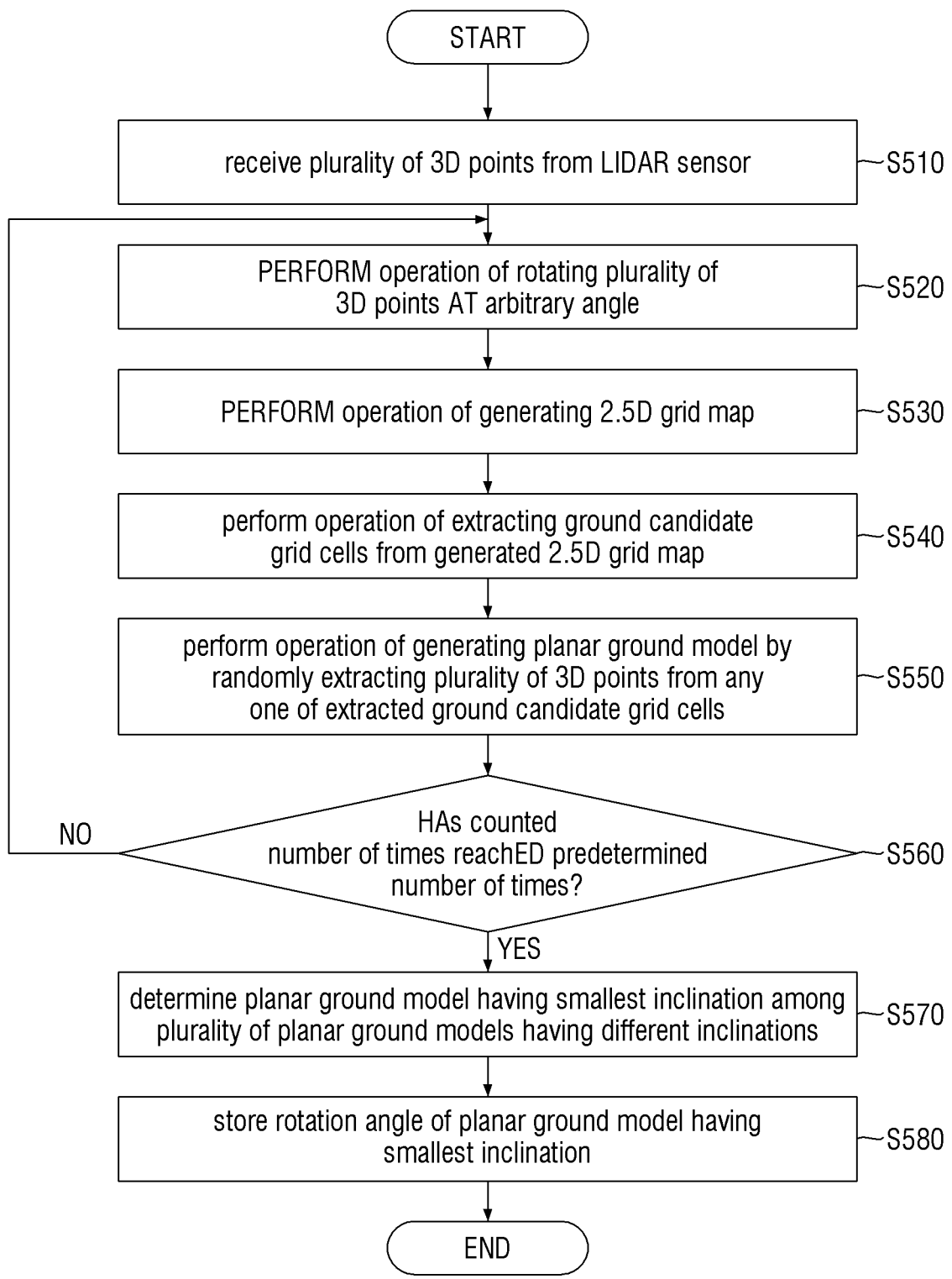
FIG. 16 is a flowchart for describing a method of calibrating Lidar point data according to an embodiment of the present invention.
Figure 17:
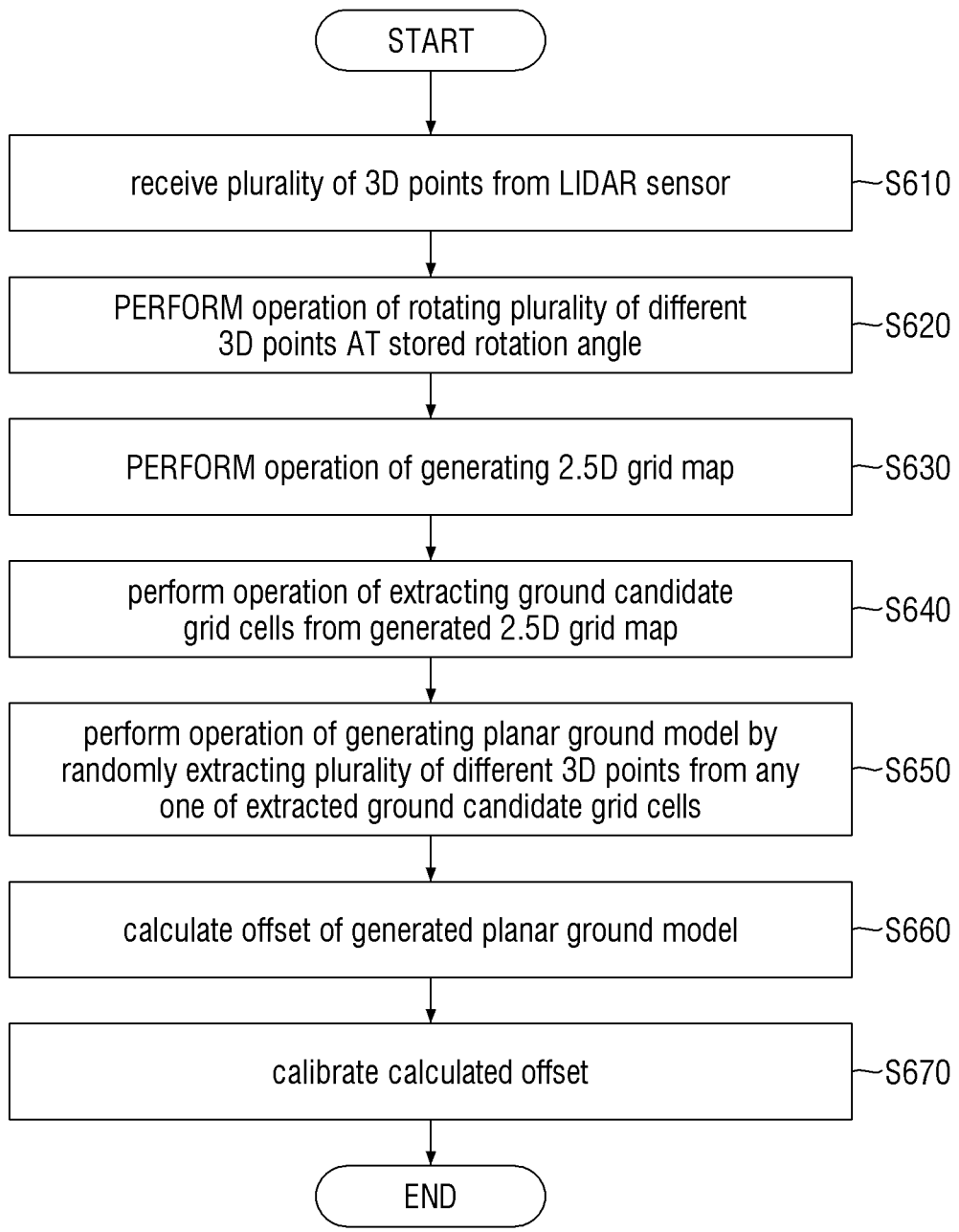
FIG. 17 is another flowchart for describing a method of calibrating Lidar point data according to an embodiment of the present invention.

A method of calibrating Lidar point data 225 is largely divided into an initialization operation and a calibration operation. FIGS. 12, 13, and 16 are descriptions of the initialization operation. FIGS. 14, 15, and 17 are descriptions of the calibration operation.

FIG. 12 shows a local coordinate system of 3D points of objects generated according to different positions of a Lidar sensor illustrated in FIG. 11.

Referring to FIGS. 11 and 12, the processor 110 receives a plurality of 3D points 223 from the Lidar sensor 221. The plurality of 3D points 223 is the Lidar point data for the object 207.

The processor 110 rotates the plurality of 3D points 223 at an arbitrary angle θ1, θ2, θ3, θ4, or θ5. When the plurality of 3D points 223 are rotated by a first arbitrary angle θ1, a plurality of first 3D points LP1 are illustrated in FIG. 12. When the plurality of 3D points 223 are rotated by a second arbitrary angle θ2, a plurality of second 3D points LP2 are illustrated in FIG. 12. A plurality of third 3D points LP3 to a plurality of fifth 3D points LP5 are illustrated in a similar manner. The fifth arbitrary angle θ5 is the largest, and the first arbitrary angle θ1 is the smallest. That is, the processor 110 performs a rotation operation of rotating the plurality of 3D points 223 at different arbitrary angles θ1, θ2, θ3, θ4, or θ5. The arbitrary angle θ1, θ2, θ3, θ4, or θ5 is in a range between −50° and 50°. The arbitrary angle θ1 may be 10°. The arbitrary angle θ1 may be 20°.

The processor 110 performs a 2.5D grid map generation operation of generating a 2.5D grid map including a plurality of grid cells using the plurality of 3D points LP1, LP2, LP3, LP4, or LP5 rotated by the arbitrary angles. The 2.5 grid map generation operation has been described in detail with reference to FIGS. 5 and 6.

The processor 110 performs an extraction operation of extracting ground candidate grid cells from the plurality of grid cells using a height difference between a 3D point having a minimum height value and a 3D point having a maximum height value included in each of the plurality of grid cells. The operation of extracting the ground candidate grid cells has been described in detail with reference to FIGS. 8, 9, and 10.

The processor 110 performs a planar ground model generation operation of randomly extracting a plurality of 3D points from any one of the extracted ground candidate grid cells to generate a planar ground model PGM1, PGM2, PGM3, PGM4, or PGM5.

FIG. 13 is a flowchart for describing a method of generating a planar ground model according to an embodiment of the present invention.

Referring to FIGS. 11 and 13, the processor 110 receives a plurality of 3D points 223 from the Lidar sensor 221.

The processor 110 randomly extracts a plurality of 3D points from any one of the extracted ground candidate grid cells to generate the planar ground model PGM1, PGM2, PGM3, PGM4, or PGM5. The generation of the planar ground model PGM1, PGM2, PGM3, PGM4, or PGM5 refers to determining the planar ground model PGM1, PGM2, PGM3, PGM4, or PGM5 and parameters of the planar ground model PGM1, PGM2, PGM3, PGM4, or PGM5.

Specifically, the planar ground model PGM1, PGM2, PGM3, PGM4, or PGM5 may be generated using the following operations.

The processor 110 performs an extraction operation of randomly extracting a plurality of 3D points from any one of the extracted ground candidate grid cells (S310). In FIG. 13, (x, y, z) represent coordinates of 3D points. For example, (1, 1, 0) represent coordinates of the 3D point.

According to an embodiment, the processor 110 randomly extracts 3D points in a state in which a plurality of 3D points are rotated by an arbitrary angle without performing the 2.5D grid map generation operation and the extraction operation of extracting the ground candidate grid cells.

The processor 110 performs a parameter calculation operation of applying the randomly extracted plurality of 3D points to a preliminary planar ground model to calculate parameters of the planar ground model (S320). The preliminary planar ground model is a mathematical model and may be a linear equation. The preliminary planar ground model refers to a linear equation in which parameters are not determined. In FIG. 13, a preliminary planar ground model MINI is expressed by the following equation.

$$0 = ax + by + cz + d \qquad \text{[Equation 1]}$$

Here, a, b, and c, and d represent parameters.

$a_i$, $b_i$, $c_i$, and $d_i$ represent the values of the parameters at the $i^{th}$ time.

The processor 110 repeatedly performs an error calculation operation of applying the remaining 3D points that are not randomly extracted among a plurality of 3D points to the first planar ground model n times (n is a natural number) to calculate an error (S330). In FIG. 13, $e_n$ represents the equation of the error.

When the calculated error is greater than or equal to a predetermined value (residual), the processor 110 performs a counting operation for counting the value of the error (S340).

The processor 110 repeatedly performs the extraction operation, the parameter calculation operation, the error calculation operation, and the counting operation for i (i is a natural number) number of times (S350).

The processor 110 applies parameters corresponding to the smallest counting value among the error values counted by repeatedly performing the counting operation to finally generate the planar ground model (S360). That is, a planar ground model with fixed parameters is generated.

Referring to FIGS. 11 and 12, the processor 110 counts the number of times to generate the plurality of planar ground models PGM1 to PGM5 having different inclinations, and repeatedly performs the rotation operation, the 2.5D grid map generation operation, the extraction operation of extracting the ground candidate grid cells, and the planar ground model generation operation until the counted number of times reaches a predetermined number of times.

For example, the processor 110 rotates the plurality of 3D points 223 received from the Lidar sensor 221 at the first arbitrary angle $\theta 1$.

The processor 110 generates a first 2.5D grid map including a plurality of first grid cells using the plurality of first 3D points LP1 rotated by the first arbitrary angle $\theta 1$.

The processor 110 extracts first ground candidate grid cells from the plurality of first grid cells.

The processor 110 randomly extracts the plurality of first 3D points included in any one of the first ground candidate grid cells to generate a first planar ground model PGM1.

The processor 110 counts the number of times, and rotates the plurality of 3D points 223 received from the Lidar sensor 221 at the second arbitrary angle $\theta 2$. The second arbitrary angle $\theta 2$ is greater than the first arbitrary angle $\theta 1$.

The processor 110 generates a second 2.5D grid map including a plurality of second grid cells using the plurality of second 3D points LP2 rotated by the second arbitrary angle $\theta 2$.

The processor 110 extracts second ground candidate grid cells from the plurality of second grid cells.

The processor 110 randomly extracts the plurality of second 3D points included in any one of the second ground candidate grid cells to generate a second planar ground model PGM2.

The processor 110 counts the number of times, and rotates the plurality of 3D points 223 received from the Lidar sensor 221 at the third arbitrary angle $\theta 3$. The third arbitrary angle $\theta 3$ is greater than the second arbitrary angle $\theta 2$.

The processor 110 generates a third 2.5D grid map including a plurality of third grid cells using the plurality of third 3D points LP3 rotated by the third arbitrary angle $\theta 3$.

The processor 110 extracts third ground candidate grid cells from the plurality of third grid cells.

The processor 110 randomly extracts the plurality of third 3D points included in any one of the third ground candidate grid cells to generate a third planar ground model PGM3.

The processor 110 generates the remaining planar ground models PGM4 and PGM5 in a similar manner. The inclinations of the generated planar ground models PGM1 to PMGS are all different.

The planar ground model having the smallest inclination may be determined to be the planar ground model having the smallest inclination by calculating an angle between the virtual plane and the planar ground model. For example, an angle between the first planar ground model PGM1 and a virtual plane VL1 may be calculated. The calculated angle is proportional to the inclination of the first planar ground model PGM1. That is, as the calculated angle increases, the inclination of the first planar ground model PGM1 increases. An angle between the second planar ground model PGM2 and a virtual plane VL2 may be calculated.

The calculated angle is proportional to the inclination of the second planar ground model PGM2.

The virtual plane VL1, VL2, VL3, VL4, or VL5 refers to a plane parallel to an axis $x_L$, $y_L$, or $z_L$.

Since the angle between the second planar ground model PGM2 and the virtual plane VL2 is smaller than the angle between the first planar ground model PGM1 and the virtual plane VL1, the processor 110 determines that the inclination of the second planar ground model PGM2 is smaller than that of the first planar ground model PGM1.

The processor 110 determines the planar ground model (e.g., PGM3) having the smallest inclination among the plurality of planar ground models PGM1 to PMGS having different inclinations. The angle between the third planar ground model PGM3 and the virtual plane VL3 is the smallest. Therefore, the inclination of the third planar ground model PGM3 among the plurality of planar ground models PGM1 to PGM5 is the smallest. The planar ground model (e.g., PGM3) having the smallest inclination means that an absolute value of the inclination is smallest.

The processor 110 stores the rotation angle θ3 corresponding to the planar ground model (e.g., LP3) having the smallest inclination in the memory 130.

The initialization operation is completed by storing the rotation angle θ3 in the memory 130.

After the initialization operation is completed, the calibration operation is performed. That is, the processor 110 calibrates the Lidar point data of the Lidar sensor 221 according to the planar ground model (e.g., PGM3) having a small inclination. The calibration operation will be described in detail with reference to FIGS. 14, 15, and 17.

FIG. 14 shows a local coordinate system of 3D points generated according to a specific position of the Lidar sensor illustrated in FIG. 11.

Referring to FIGS. 11 to 14, the processor 110 receives a plurality of different 3D points LP_N1 from the Lidar sensor 221 at different times. The plurality of different 3D points LP_N1 refers to the Lidar point data received by the Lidar sensor 221 at a second time which is a different time. In FIG. 12, the plurality of 3D points LP1, LP2, LP3, LP4, or LP5 refer to Lidar point data received by the Lidar sensor 221 at the first time. That is, the plurality of different 3D points LP_N1 refers to Lidar point data received by the Lidar sensor 221 at a time point after the initialization operation described with reference to FIG. 14 ends. Reference numeral LP_N1 may be a plurality of different 3D points.

The processor 110 performs the rotation operation of rotating the plurality of different 3D points at the rotation angle (e.g., θ3) stored in the memory 130 in FIG. 16. When the plurality of different 3D points LP_N1 are rotated by the rotation angle (e.g., θ3) stored in the memory 130 in FIG. 14, other rotated 3D points LP_N2 are positioned.

The processor 110 performs the 2.5D grid map generation operation of generating the 2.5 grid map including the plurality of grid cells using the plurality of different 3D points LP_N2 rotated by the rotation angle (e.g., θ3) stored in the memory 130.

The processor 110 performs the extraction operation of extracting the ground candidate grid cells from the plurality of grid cells.

The processor 110 performs a planar ground model generation operation of randomly extracting a plurality of different 3D points from any one of the extracted ground candidate grid cells to generate the planar ground model PGM_N.

The processor 110 calculates an offset OFFSET_A or OFFSET_B of the generated planar ground model PGM_N. The first offset OFFSET_A may be calculated using the angular difference in the between the planar ground model PGM_N and the virtual plane VL_N. The second offset OFFSET_B may be calculated using a difference between a Z coordinate value of the planar ground model PGM_N and a Z coordinate value of an origin CL of the local coordinate system. Also, the second offset OFFSET_B may be calculated using the Z coordinate value of the Lidar sensor 221 in the global coordinate system.

FIG. 15 shows the global coordinate system obtained by transforming the local coordinate system illustrated in FIG. 14.

Referring to FIGS. 11 to 15, the processor 110 calibrates the offset OFFSET_A or OFFSET_B of the planar ground model PGM_N. When the offset OFFSET_A, or OFFSET_B of the planar ground model PGM_N is calibrated, coordinates of calibrated 3D points CLP are illustrated in the global coordinate system as illustrated in FIG. 15.

The processor 110 may calibrate coordinates of a plurality of different 3D points to calibrate the distortion of the Lidar point data according to the position of the Lidar sensor 221.

FIG. 16 is a flowchart for describing a method of calibrating Lidar point data according to an embodiment of the present invention.

Referring to FIGS. 11 to 16, the processor 110 receives the plurality of 3D points 223 from the Lidar sensor 221 (S510). The plurality of 3D points 223 is the Lidar point data for the object 207.

The processor 110 performs the rotation operation of rotating the plurality of 3D points 223 at an arbitrary angle (S520).

The processor 110 performs the 2.5D grid map generation operation of generating the 2.5D grid map including the plurality of grid cells using the plurality of 3D points 223 rotated by the arbitrary angle (S530).

The processor 110 performs the extraction operation of extracting the ground candidate grid cells from the plurality of grid cells using the height difference between the 3D point having the minimum height value and the 3D point having the maximum height value included in each of the plurality of grid cells (S540).

The processor 110 performs the planar ground model generation operation of randomly extracting the plurality of 3D points from any one of the extracted ground candidate grid cells to generate the planar ground model (S550).

The processor 110 counts the number of times, and repeatedly performs the rotation operation (S520), the 2.5D grid map generation operation (S530), the extraction operation (S540), and the planar ground model generation operation (S550) until the counted times of number reaches a predetermined number of times to generate the plurality of planar ground models PGM1 to PGM5 having different inclinations (S560).

The processor 110 determines the planar ground model (e.g., PGM3) having the smallest inclination among the plurality of planar ground models PGM1 to PMGS having different inclinations (S570).

The processor 110 stores the rotation angle θ3 of the planar ground model (e.g., LP3) having the smallest inclination in the memory 130 (S580).

FIG. 16 shows the initialization operation of storing the rotation angle (e.g., θ3) corresponding to the planar ground model (e.g., PGM3) having the smallest inclination among the plurality of planar ground models PGM1 to PGM5 having different inclinations in the memory 130.

FIG. 17 is another flowchart for describing a method of calibrating Lidar point data according to an embodiment of the present invention.

FIG. 17 illustrates the calibration operation after the initialization operation of the Lidar sensor. Referring to FIGS. 14, 15, and 17, the processor 110 receives the plurality of different 3D points LP_N1 from the Lidar sensor 221 (S610). The plurality of different 3D points refers to the Lidar point data received by the Lidar sensor 221 at the second time. In FIG. 16, the plurality of 3D points refers to the Lidar point data received by the Lidar sensor 221 at the first time. That is, the plurality of different 3D points LP_N1 refers to Lidar point data received by the Lidar sensor 221 at a time point after the initialization operation described with reference to FIG. 16 ends. The first time and the second time are different times.

The processor 110 performs the rotation operation of rotating the plurality of different 3D points LP_N1 at the rotation angle (e.g., θ3) stored in the memory 130 in FIG. 16 (S620). When the plurality of different 3D points LP_N1 are rotated by the rotation angle (e.g., θ3) stored in the memory 130 in FIG. 16, the position is changed to the plurality of different 3D points LP_N2.

The processor 110 performs the 2.5D grid map generation operation of generating the 2.5 grid map including the plurality of grid cells using the plurality of different 3D points LP_N2 rotated by the rotation angle (e.g., θ3) stored in the memory 130 (S630).

The processor 110 performs an operation of extracting ground candidate grid cells from the plurality of grid cells using a height difference between a 3D point having a minimum height value and a 3D point having a maximum height value included in each of the plurality of grid cells (S640).

The processor 110 performs a planar ground model generation operation of randomly extracting a plurality of different 3D points from any one of the extracted ground candidate grid cells to generate the planar ground model PGM_N (S650).

The processor 110 calculates the offset OFFSET_A or OFFSET_B of the generated planar ground model PGM_N (S660).

The processor 110 calibrates the calculated offset OFFSET_A or OFFSET_B (S670). Coordinates of different 3D points may be calibrated by calibrating the calculated offset OFFSET_A or OFFSET_B. That is, the coordinates of the plurality of different 3D points are calibrated with the coordinates CLP of the 3D points, which are the plurality of different 3D points.

According to a method and system for calibrating Lidar point data of embodiments of the present invention, it is possible to calibrate a distortion of Lidar point data according to a position of a Lidar sensor by generating a planar ground model using three-dimensional (3D) points generated by the Lidar sensor and calibrating coordinates of the 3D points accordingly.

In addition, according to a method and system for calibrating Lidar point data of embodiments of the present invention, it is possible to calibrate Lidar point data using only a plurality of 3D points received from one Lidar sensor without an additional Lidar sensor.

In addition, according to a method and system for calibrating Lidar point data of embodiments of the present invention, it is possible to calibrate Lidar point data using only a plurality of 3D points received from one Lidar sensor without a separate sensor for calibration of the Lidar point data.

Although the present invention has been described with reference to exemplary embodiments illustrated in the drawings, it is only exemplary, and it will be understood by those skilled in the art that various modifications and other equivalent exemplary embodiments are possible from the present invention. Accordingly, an actual technical protection scope of the present invention is to be defined by the technical spirit of the following claims.

What is claimed is:

1. A system for calibrating light detection and ranging (Lidar) point data, comprising a computing device,
    wherein the computing device includes:
    a processor; and
    a memory configured to store instructions executed by the processor,
    wherein the instructions are implemented to receive a plurality of three-dimensional (3D) points from a Lidar sensor, and calibrate the Lidar point data of the Lidar sensor according to an operation of rotating the plurality of 3D points at an arbitrary angle and an operation of generating planar ground models by randomly extracting the plurality of 3D points rotated by the arbitrary angle.

2. The system of claim 1, wherein the instructions are implemented to further perform an operation of generating a 2.5D grid map including a plurality of grid cells using the plurality of 3D points rotated by the arbitrary angle and an operation of extracting ground candidate grid cells from the plurality of grid cells using a height difference between a 3D point having a minimum height value and a 3D point having a maximum height value included in each of the plurality of grid cells between the operation of rotating and the operation of generating planar ground models.

3. The system of claim 2, wherein the plurality of generated planar ground models having different inclinations are generated by randomly extracting 3D points included in the extracted ground candidate grid cells.

4. A method of calibrating light detection and ranging (Lidar) point data, comprising:
    rotating, by a processor, a plurality of 3D points received from a Lidar sensor at a first arbitrary angle to randomly extract a plurality of first 3D points rotated by the first arbitrary angle and generate a first planar ground model;
    rotating, by the processor, the plurality of 3D points at a second arbitrary angle to randomly extract a second a plurality of second 3D points rotated by the second arbitrary angle and generate a second planar ground model; and
    calibrating, by the processor, Lidar point data of the Lidar sensor according to the generated first planar ground model and the generated second planar ground model.

5. The method of claim 4, further comprising:
    generating, by the processor, a first 2.5D grid map including a plurality of first grid cells using the plurality of first 3D points rotated by the first arbitrary angle; and
    extracting, by the processor, first ground candidate grid cells from the plurality of first grid cells using a height difference between a 3D point having a minimum height value and a 3D point having a maximum height value included in each of the plurality of first grid cells,
    wherein the first planar ground model is generated by randomly extracting the plurality of first 3D points included in any one of the first ground candidate grid cells.

6. The method of claim 4, further comprising:
    generating, by the processor, a second 2.5D grid map including a plurality of second grid cells using the plurality of second 3D points rotated by the second arbitrary angle; and extracting, by the processor, second ground candidate grid cells from the plurality of second grid cells using a height difference between a 3D point having a minimum height value and a 3D point having a maximum height value included in each of the plurality of second grid cells, wherein the second planar ground model is generated by randomly extracting the plurality of second 3D points included in any one of the second ground candidate grid cells.

7. The method of claim 4, further comprising:

rotating, by the processor, a plurality of 3D points at a third arbitrary angle; and generating, by the processor, a third planar ground model by randomly extracting a plurality of third 3D points rotated by the third arbitrary angle, wherein a planar ground model having a small inclination is a planar ground model having the smallest inclination among the first planar ground model, the second planar ground model, and the third planar ground model.

8. The method of claim 4, wherein the calibrating of, by the processor, the Lidar point data of the Lidar sensor according to a planar ground model having a small inclination includes:

storing, by the processor, a rotation angle corresponding to the planar ground model having the small inclination;

receiving, by the processor, a plurality of different 3D points from the Lidar sensor at different times;

rotating, by the processor, the plurality of different 3D points at the stored rotation angle;

generating, by the processor, other 2.5D grid maps including a plurality of different grid cells using a plurality of different 3D points rotated by the stored rotation angle;

extracting, by the processor, other ground candidate grid cells from the plurality of different grid cells;

randomly extracting, by the processor, the plurality of different 3D points included in any one of the other extracted ground candidate grid cells to generate other planar ground models; and calculating, by the processor, an offset of the other planar ground models, and calibrating positions of the plurality of different 3D points according to the calculated offset.

9. A computing device comprising:

a processor; and a memory configured to store instructions executed by the processor, wherein the instructions are implemented to receive a plurality of 3D points from a light detection and ranging (Lidar) sensor, and calibrate the Lidar point data of the Lidar sensor according to an operation of rotating the plurality of 3D points at an arbitrary angle and an operation of generating planar ground models by randomly extracting the plurality of 3D points rotated by the arbitrary angle.

10. The computing device of claim 9, wherein the instructions are implemented to further perform an operation of generating a 2.5D grid map including a plurality of grid cells using the plurality of 3D points rotated by the arbitrary angle and an operation of extracting ground candidate grid cells from the plurality of grid cells using a height difference between a 3D point having a minimum height value and a 3D point having a maximum height value included in each of the plurality of grid cells between the operation of rotating and the operation of generating planar ground models.

11. The computing device of claim 10, wherein the plurality of generated planar ground models having different inclinations are generated by randomly extracting 3D points included in the extracted ground candidate grid cells.

* * * * *